United States Patent [19]

Burkard et al.

[11] Patent Number: 5,035,137
[45] Date of Patent: Jul. 30, 1991

[54] TIRE PRESSURE SENSOR FOR MOTOR VEHICLES

[75] Inventors: Johannes Burkard, Nuremberg; Gerhard Hettich, Dietenhofen; Hans-Dieter Schmid, Nuremberg, all of Fed. Rep. of Germany

[73] Assignee: Robert Bosch GmbH, Stuttgart, Japan

[21] Appl. No.: 459,753
[22] PCT Filed: Apr. 22, 1988
[86] PCT No.: PCT/DE88/00241
    § 371 Date: Jan. 10, 1990
    § 102(e) Date: Jan. 10, 1990
[87] PCT Pub. No.: WO89/00511
    PCT Pub. Date: Jan. 26, 1989

[30] Foreign Application Priority Data
Jul. 16, 1987 [DE] Fed. Rep. of Germany ....... 3723510

[51] Int. Cl.$^5$ .......................... B60C 23/02; G01L 9/00
[52] U.S. Cl. ..................................... 73/146.5; 73/723; 200/61.25; 340/442

[58] Field of Search ................. 73/146.5, 146.8, 146.3, 73/723; 200/61.22, 61.25; 340/442, 445, 448, 447

[56] References Cited
U.S. PATENT DOCUMENTS
4,701,742 10/1987 Ruchr ................................. 73/146.5

FOREIGN PATENT DOCUMENTS
3738413 2/1989 Fed. Rep. of Germany ...... 340/442

Primary Examiner—Donald O. Woodiel
Attorney, Agent, or Firm—Michael J. Striker

[57] ABSTRACT

A tire pressure sensor for monitoring pressure in the tire of a motor vehicle wheel and comprising a reference pressure chamber, two contact members extending through a bushing insulator arranged in the base of the reference pressure chamber, and an electrically conducting diaphragm that separates the reference pressure chamber from the tire interior. The diaphragm has two contact zones that engage sequentially the two contact members upon being bent in response to air pressure in the tire interior reaching, respectively, a first value and a second value greater than the first value.

6 Claims, 2 Drawing Sheets

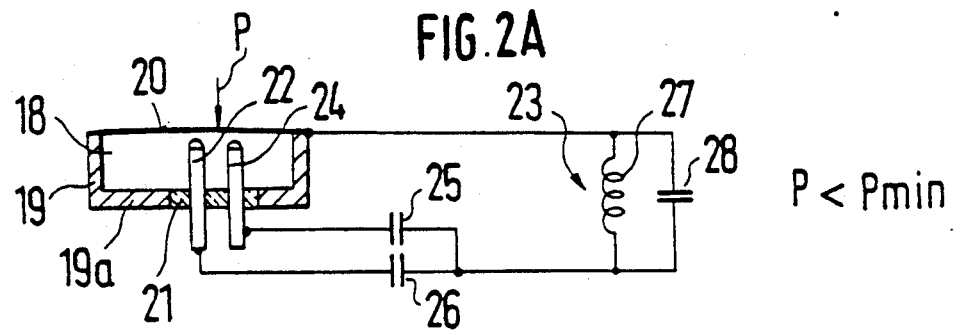
FIG.2A  $P < P_{min}$
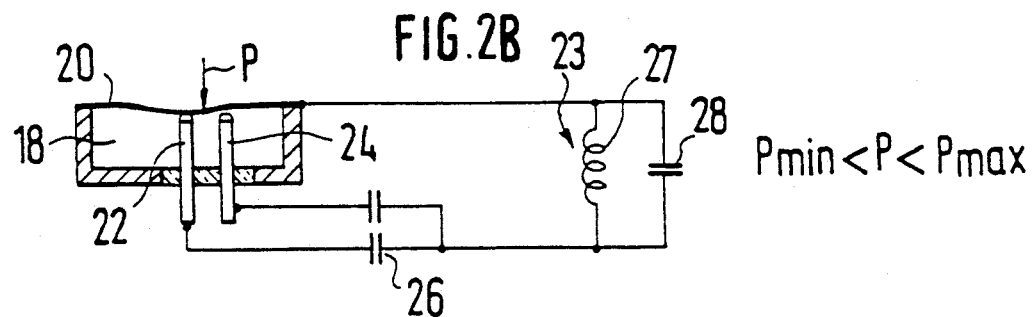
FIG.2B  $P_{min} < P < P_{max}$
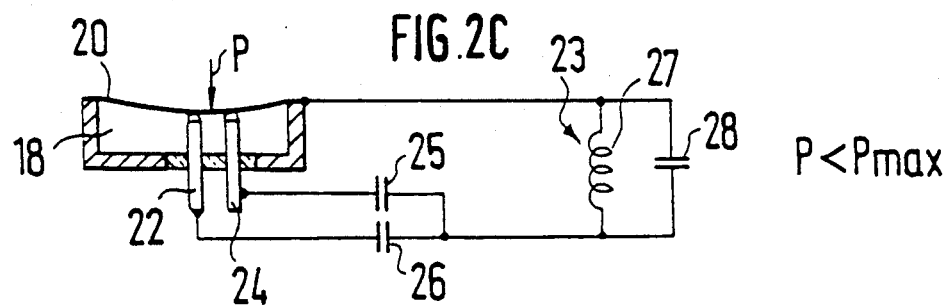
FIG.2C  $P < P_{max}$
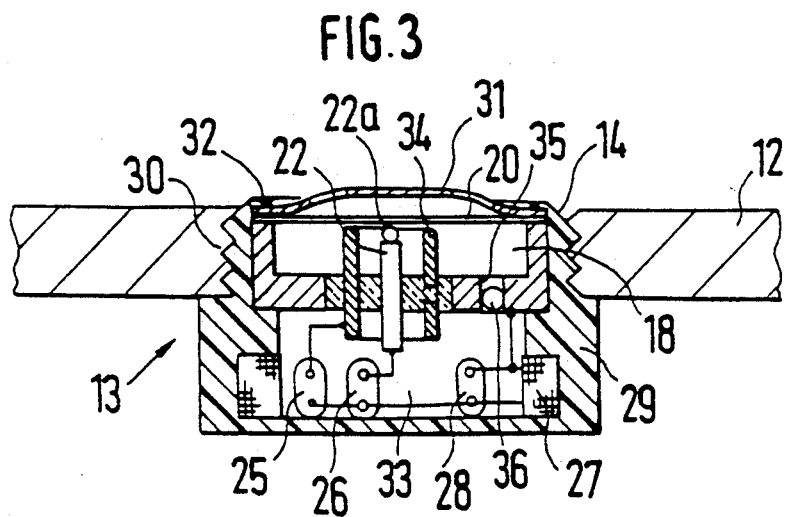
FIG.3

TIRE PRESSURE SENSOR FOR MOTOR VEHICLES

BACKGROUND OF THE INVENTION

The invention relates to a tire pressure sensor for motor vehicles and which is to be secured at the wheel rim circumference and is actuatable by the tire pressure. The sensor comprises a reference pressure chamber and an electrically conducting diaphragm which separates the reference chamber from the tire and cooperates with a contact pin extending through the center of the base of the reference pressure chamber. In such a known pressure sensor (EP-A-0 157 205), two pressure measuring elememts with different threshold values for monitoring the tire pressure are fastened next to one another in the circumferential direction at the wheel rim. In vehicles for which different tire pressures are provided at the front wheels and the rear wheels, the different threshold values make it possible to exchange the wheels between the front and rear axle at any time without the pressure measuring elements also having to be exchanged simultaneously. The two threshold values are adjusted to the different tire pressures, respectively.

An excess pressure in the tire, at which the driving comfort and possibly also the driving behavior of the vehicle is impaired due to the reduced contact of the tire with the road, can also be determined and indicated, if necessary, by such a sensor when tires with a lower required tire pressure are used. However, such monitoring of the excess tire pressure is not possible in the tires filled at higher pressure. Moreover, with the sensors of this type, the correct functioning of the tire pressure sensor can hardly be monitored after installation at the rim. Thus, for example, it is possible that the diaphragm of the tire pressure sensor or a protective cap thereof is pressed in when exchanging the tires, and the switching function of the diaphragm is accordingly blocked. In such cases, a sufficient air pressure in the tire is also indicated during the tire pressure monitoring while the air pressure lies below the threshold value of the tire pressure sensor.

SUMMARY OF THE INVENTION

The object of the invention is to provide the possibility of monitoring blocking of the diaphragm of the tire pressure sensor due to mechanical damage as well as the maintaining of the required air pressure in the tire between two threshold values in a simple manner.

The object of the invention is acheived by using at least one additional switching member for monitoring the tire pressure in the tire pressure sensor. The additional switching member is actuated jointly with the first switching member by the diaphragm of the tire pressure sensor at different values of the tire pressure. Accordingly, switching thresholds for different tire pressures at the front and rear wheels of the motor vehicle can be realized in a tire pressure sensor. But such a tire pressure sensor can also monitor the tire pressure with respect to different limits, e.g. to an upper limit and a lower limit, equally as well. Finally, with the tire pressure sensors according to the invention, it is also possible to determine blocking of the diaphragms due to mechanical damage in a simple manner after installation of the sensors at the rim, e.g. during the mounting of the tire. If the tire is filled to the prescribed air pressure, but the electronic tire pressure monitor indicates an excess pressure, it means both switching members of the tire pressure sensor are closed because of deformation of the diaphragm.

It is particularly advantageous to form the second switching member as an additional contact pin which is fastened with the first contact pin arranged in the center of the reference chamber, and which extends through the base of the reference pressure chamber and is insulated from it. This solution requires no additional work steps in the production of the tire pressure sensor, since the two contact pins are inserted jointly into the reference pressure chamber. Moreover, the contact arrangement is easier to form, if the second switching member comprises an annular contact body which is guided around the front end of the center contact pin. A sleeve-shaped contact body is advisably arranged coaxially relative to the center contact pin.

The present invention both as to its construction so to its method of operation, together with additional objects and advantages thereof, will be best understood from the following detailed description of specific embodiments when read in connection with the accompanying drawings.

BRIEF DESCRIPTION OF THE DRAWINGS

Embodiment examples of the invention are shown in the drawing and explained in more detail in the following.

FIG. 2a shows a schematic view of the tire pressure sensor, according to the invention, with two contacts pins and a resonant circuit connected with the pins in a position when air pressure is too low;

FIG. 2b shows the same view as FIG. 2a but in a position of the sensor when air pressure in the tire is sufficient;

FIG. 2c shows the same view as FIGS. 2a and 2b but in a position when air pressure is too high in the vehicle tire; and FIG. 3 shows a cross-sectional view of another embodiment of tire pressure sensor with a sleeve-shaped contact body arranged coaxially relative to the center contact pin.

DESCRIPTION OF THE PREFERRED EMBODIMENTS

Figure 1:
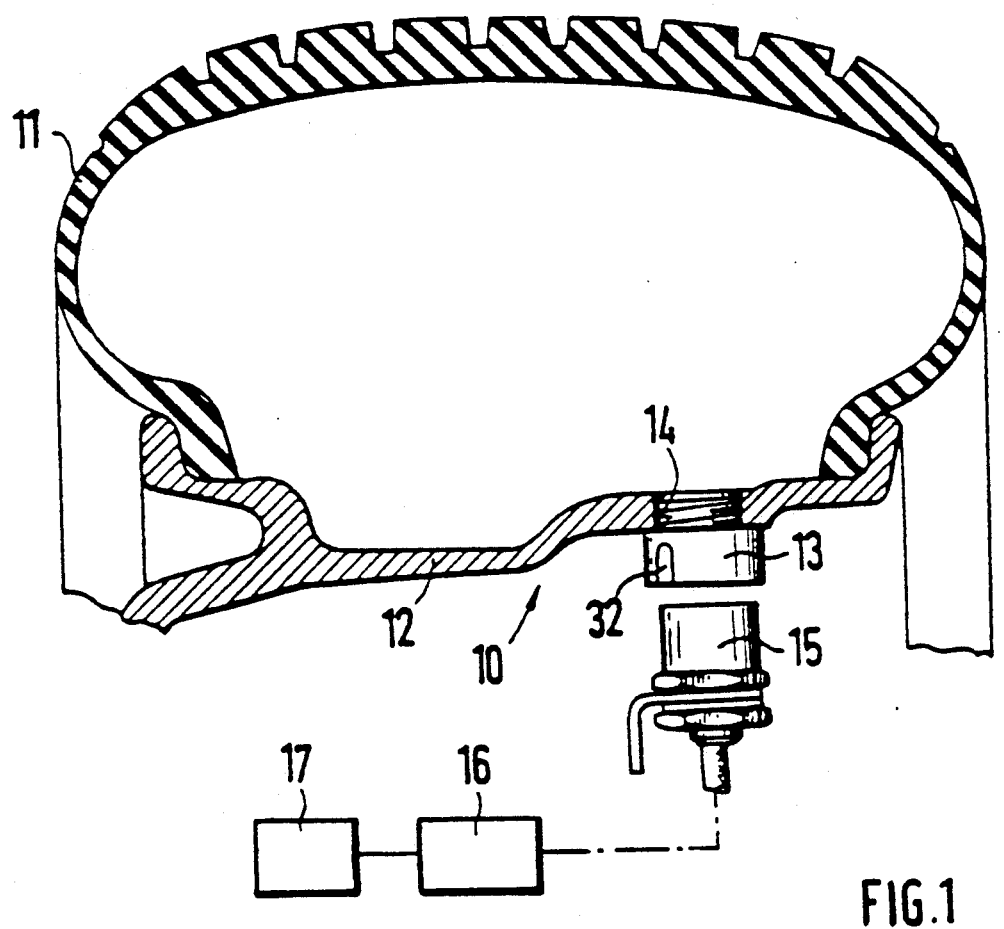
FIG. 1 shows a cross-sectional view of a vehicle wheel with a tire pressure sensor according to the invention and a block wiring diagram of the evaluating circuit.

FIG. 1 shows a 10 section of a motor vehicle in a reduced scale. It shows a tire 11 which is mounted on a wheel rim 12. A tire pressure sensor 13 is inserted in a threaded bore 14 of the wheel rim 12 at an inwardly directed portion of the rim. At a slight distance from the sensor 13, a signal pick-up 15, whose front side is directed toward the tire pressure sensor 13, is fastened in the area of the tire pressure sensor 13 at the wheel suspension of the vehicle, not shown. The signal pick-up 15 transmits a high-frequency oscillation produced in an evaluating circuit 16, to the tire pressure sensor 13 when it passes the signal pick-up 15 during a revolution of the vehicle wheel 10. An electrical resonant circuit is accomodated in the tire presure sensor 13, which is closed when a predetermined air pressure is reached in the tire 11. The resonant circuit dampens the high-frequency oscillation at the signal pick-up 15 functioning as a filter circuit. This damping, which correspondingly cyclical when the vehicle wheel 10 is rotates, is monitored in the evaluating circuit 16 for every vehicle wheel. When the dampening fails or is reduced, the indicator 17 indicates which of the monitored tires has an air pressure which is too low.

The schematic construction of the tire pressure sensor 13 and its operation is schematically shown and explained with reference to FIGS. 2a-2c. The tire pressure sensor substantially comprises a reference pressure chamber 18 whose chamber housing 19, made of steel, is closed toward the tire by an electrically conducting diaphragm 20. A first contact pin 22 is arranged in the housing base 19a of the reference pressure chamber 18 in the center of the base in a bushing insulator 21 so as to be electrically insulated and cooperates, as a first switching member, with a diaphragm 20. The first contact pin 22 and the diaphragm 20 are connected inside the tire pressure sensor with a branch of a resonant circuit 23 which is closed when there is sufficient air pressure P in the tire.

Next to the first contact pin 22, which is arranged in the center in the housing base 19a of the reference pressure chamber 18, a second contact pin 24 is fastened in the common bushing insulator 21 so as to be insulated from the first contact pin 22. This second contact pin 24, together with the diaphragm 20, forms a second switching member with the diaphragm 20 and is likewise connected to the resonant circuit 23 only when the diaphragm is substantially bent. As shown in FIGS. 2a-2c, the two contact pins 22 and 24 which are arranged adjacent to one another, are connected by separate capacitors 25, 26 which serve as capacitive component with a common coil 27 which serves as inductive component of the resonant circuit 23. The other end of the coil 27 is connected with the diaphragm 20. An additional capacitor 28 lies parallel to the coil 27. This indicates three resonant frequencies: f1 >both switches open>; f2 (one closed switch); f3 (both closed switches).

Since the reference pressure chamber 18 of the tire pressure sensor 13 is filled with a gas at a predetermined pressure, the tire pressure P acting from the outside deflects the diaphragm 20 against the pressure in the reference pressure chamber 18. FIG. 2a shows that at a tire pressure P which lies below a minimum pressure Pmin predetermined by the lower threshold value of the tire pressure sensor 13, the diaphragm 20 is not bent inward to the extent that it contacts the contact pins 22 and 23. The resonant circuit 23 is formed in the state of the tire pressure sensor 13 (P>Pmin) from the coil 27 and the capacitor 28. The resulting resonant frequency f1 is detected by the signal pick-up 15 and the evaluating circuit 16. An indication of excessively low air pressure in the tire 11 of the corresponding wheel 10 accordingly appears on the indicator 17.

FIG. 2b shows the reference pressure chamber 18 in a state which occurs when the tire pressure P is greater than the minimum pressure Pmin predetermined by the lower threshold value, but smaller than the pressure Pmax predetermined by the upper threshold value of the tire pressure sensor 10 (Pmin>P>Pmax). In this case, the diaphragm 20 is bent against the pressure in the reference pressure chamber 18 by application of the tire pressure P until it contacts the center contact pin 22 and accordingly closes a circuit branch which results in the capacitor 26, in addition to the capacitor 28, being connected parallel to the coil 27 of the resonant circuit 23. The occurring resonant frequency f2 is now detected by the signal pick-up 15 with the evaluating circuit 16 and the indicator 17 shows that the monitored tire pressure is in order.

In FIG. 2c, the diaphragm 20 of the reference pressure chamber 18 is acted upon by a tire pressure P which is greater than the upper threshold value Pmax of the tire pressure sensor 13 (Pmax). The diaphragm 20 is now bent until it contacts both the center contact pin 22 and the adjacent contact pin 24. An additional electric circuit is accordingly closed with the capacitor 25, which is likewise connected in parallel with the coil 27 of the resonant circuit 23. This results in another resonant frequency f3. It is detected via the pick-up 15 by the evaluating circuit 16 and the driver is given an indication via the indicator 17 of an excessive air pressure in the monitored tire 11.

In another embodiment, FIG. 3 shows a cross-sectional view of the tire pressure sensor 13 screwed into the threaded bore 14 of the wheel rim 12. The tire pressure sensor 13 comprises a housing 29, preferably of insulating material, with a threaded shoulder 30 for fastening in the threaded bore 14 of the wheel rim 12. The housing 29 at its reference pressure chamber 18 with the diaphragm 20 at its side facing the tire 11, which diaphragm 20 is to be protected from mechanical damage in the front by a perforated cover plate 31. The cover plate 31 is fastened by a flanged rim 32 of the housing in front of the diaphragm 20. Located in the lower portion of the sensor housing 29 is a resonant circuit chamber 33 with the coil 27 and the capacitors 25, 26 and 28 which are connected with one another as shown in FIGS. 2a-2c and with the switching members of the tire pressure sensor 13 to form a resonant circuit 23. The center contact pin 22 is melted into a glass bushing insulator 21 in the base of 19a of the chamber housing 19 together with a sleeve-shaped contact body 34. At the front end, the contact pin 22 carries a contact ball 22a which contacts a central contact zone of the diaphragm 20 when the diaphragm bends when there is sufficient air pressure in the tire 11 and accordingly closes a branch of the resonant circuit 23. The upper end of the sleeve-shaped contact body arranged coaxially around the contact pin 22 is set back somewhat relative to the contact ball 22a of the center contact pin 22 or is at the same height, so that the annular contact zone of the diaphragm 20 located above it only contacts this body 34 when the diaphragm is bent substantially and accordingly closes another branch of the resonant circuit 23. Here, the sleeve-shaped contact body 34 is connected in a parallel with the coil 27 of the resonant circuit 23 with the capacitor 25, and the center contact pin 22 is connected in parallel with coil 27 of the resonant circuit 23 with the capacitor 26.

The lower threshold value of the tire pressure sensor 13 is determined by the pressure of the gas which is introduced into the reference chamber 18 via a bore 35. The bore is sealed against pressure by a ball 36 after filling the reference chamber 18 with the gas. The difference between the lower and upper threshold values of the tire pressure sensor 13 is chiefly determined by distance between the positions of the diaphragm 20 when it contacts ball 22a of the center contact pin 12 and the contact body 34 arranged coaxially relative to the center contact pin 22.

In the same manner as explained in FIG. 2, this tire pressure sensor 13 also monitors whether the air pressure in the tire 11 lies between the two switching thresholds of the tire pressure sensor 13, or falls below the lower switching threshold, or exceeds the upper switching threshold. In addition to the indication of an excessively low tire pressure in a leaky tire, it is also desirable to detect an excessive tire pressure, since the tire can be damaged by it or its properties can deteriorate.

Moreover, it can be determined in a simple manner by such a tire pressure sensor 13 whether or not the cover cap 31 in front of the diaphragm 20 is pressed in and the diaphragm 20 is accordingly blocked after the installation of the tire pressure sensor 13 in the wheel rim 11, e.g. when mounting or exchanging a tire. In this case, the diaphragm 20 contacts both contacts 22, 24 and shows a corresponding indication of a sensor defect or excess pressure on the indicator 17 at the beginning of driving. Since the indicator does not distinguish between a sensor defect and an excess pressure, the tire pressure is first reduces. If the indicator 17 remains unchanged, the diaphragm 20 is blocked. A costly testing of the operation of the tire pressure sensor 13 or visual monitoring by removing the sensor the sensor every time a tire is mounted can thus be avoided.

The invention is not limited to the shown embodiments. Thus, a separate bushing insulator for each switching member in the base of the reference pressure chamber can be selected. The sleeve-shaped contact body can be produced from a tube portion or a bent sheet metal strip. It can also be constructed as a pin which carries a contact ring below the diaphragm. Moreover, a plurality of contact bodies can also be arranged around the center contact pin at various distances from the diaphragm, which contact bodies sense different threshold values and close other electrical circuits. In addition, it is possible in the framework of the invention to connect the switching members at the tappings of the induction coil instead of a resonant circuit with the capacitors connected in series with the switching members.

While the invention has been illustrated and described as embodied in a tire pressure sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without ommitting features that, from the standpoint of prior art, fairly constitute essential characteristics of the generic or specific aspects of this invention.

What is claimed as new and desired to be protected by Letters Patent is set forth in the appended claims.

What is claimed is:

1. A tire pressure sensor to be secured at a circumference of a rim of a wheel of a motor vehicle for monitoring air pressure in the wheel tire, said tire pressure sensor comprising a reference pressure chamber including a base and a bushing insulator arranged in said base: an electrically conducting diaphragm for separating said reference pressure chamber from a tire interior; a first contact pin extending in a center of said base through said bushing insulator; and a contact body extending through said bushing insulator adjacent to said first contact pin, said diaphragm having a first contact zone for engaging said first contact pin, upon being in response to air pressure in the wheel tire reaching a first predetermined value, to close a first resonant circuit, and a second contact zone for engaging said contact boby, upon being bent in response to air pressure in the wheel tire reaching a second predetermined value greater than the first predetermined value, to close a second resonant circuit.

2. A tire pressure sensor as set forth in claim 1, wherein said contact body is formed as a second contact pin.

3. A tire pressure sensor as set forth in claim 1, wherein said contact body comprises a member which surrounds at least a front end of said first contact pin.

4. A tire pressure sensor as set forth in claim 3, wherein said contact body comprises a sleeve member arranged coaxially with said first contact pin.

5. A tire pressure sensor as set forth in claim 1, further comprising an inductive component attached at one end thereof to said diaphragm, and first and second capacitance component for connecting said first contact pin and said contact body, respectively, with another end of said inductive component to form first and second resonant circuits, respectively.

6. A tire pressure sensor as set forth in claim 5, further comprising an additional capacitance component connected parallel to said inductive component.

* * * * *